US012730674B2

(12) United States Patent
Liu et al.

(10) Patent No.: US 12,730,674 B2
(45) Date of Patent: Sep. 8, 2026

(54) POWER-PERFORMANCE BASED SYSTEM MANAGEMENT

(71) Applicant: International Business Machines Corporation, Armonk, NY (US)

(72) Inventors: Yang Liu, Shanghai (CN); Yue Xu, Shanghai (CN); Peng Fei Gou, Shanghai (CN); Meng Li, Changshu (CN); Xing Zhao, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 387 days.

(21) Appl. No.: 16/904,621

(22) Filed: Jun. 18, 2020

(65) Prior Publication Data

US 2021/0397476 A1 Dec. 23, 2021

(51) Int. Cl.

*G06F 9/48* (2006.01)
*G06F 11/34* (2006.01)

(52) U.S. Cl.

CPC ........ *G06F 9/4893* (2013.01); *G06F 11/3495* (2013.01); *G06F 2209/486* (2013.01)

(58) Field of Classification Search

CPC ...... G06F 1/329; G06F 9/4881; G06F 9/4893; G06F 9/5094; G06F 1/324; G06F 1/3296; H04L 41/0833; H04L 43/08; H04L 47/783; H04L 47/821; H04W 52/0251; H04W 52/029

See application file for complete search history.

(56) References Cited

U.S. PATENT DOCUMENTS 8,595,515 B1 * 11/2013 Weber .................. G06F 9/5094 713/300
9,009,500 B1 * 4/2015 Fan .......................... G06F 9/50 713/300

(Continued)

FOREIGN PATENT DOCUMENTS

CN 106502358 A 3/2017
CN 109614216 A 4/2019

(Continued)

OTHER PUBLICATIONS

Arimilli et al., "IBM POWER9 processor and system features for computing in the cognitive era," IBM Journal of Research and Development, vol. 62, No. 4/5, Paper 1, Sep. 24, 2018, 11 pages. <https://ieeexplore.ieee.org/abstract/document/8458465>.

(Continued)

*Primary Examiner* — Bradley A Teets
*Assistant Examiner* — Melissa A Headly
(74) *Attorney, Agent, or Firm* — Scott Dobson

(57) ABSTRACT

A method comprises receiving a workload for a computer system; sweeping at least one parameter of the computer system while executing the workload; monitoring one or more characteristics of the computer system while sweeping the at least one parameter, the one or more characteristics including total power consumption of the computer system; generating a power profile for the workload that indicates a respective selected value for the at least one parameter based on analysis of the monitored total power consumption of the computer system while sweeping the at least one parameter; and executing the workload based on the respective selected value of the at least one parameter.

21 Claims, 7 Drawing Sheets

(56) References Cited

U.S. PATENT DOCUMENTS

| | | | | |
|---|---|---|---|---|
| 9,519,878 | B2 * | 12/2016 | Sankar | G06Q 50/06 |
| 9,886,316 | B2 * | 2/2018 | Belady | G06Q 30/0283 |
| 10,429,921 | B2 | 10/2019 | Potlapally | |
| 10,558,768 | B1 * | 2/2020 | Weber | G06F 1/3206 |
| 11,137,807 | B2 * | 10/2021 | Ahuja | G06F 1/3287 |
| 2009/0328055 | A1 * | 12/2009 | Bose | G06F 1/329<br>718/105 |
| 2010/0031075 | A1 * | 2/2010 | Kapil | G06F 11/3062<br>713/340 |
| 2012/0017099 | A1 * | 1/2012 | David | G06F 1/3203<br>713/300 |
| 2014/0075222 | A1 * | 3/2014 | Jackson | G06F 1/329<br>713/320 |
| 2015/0046685 | A1 | 2/2015 | Park | |
| 2016/0054779 | A1 | 2/2016 | Bodas | |
| 2016/0054780 | A1 * | 2/2016 | Bodas | G06F 1/3234<br>713/320 |
| 2016/0077571 | A1 * | 3/2016 | Sagar | G06F 11/3024<br>713/340 |
| 2016/0139964 | A1 | 5/2016 | Chen | |
| 2017/0031423 | A1 | 2/2017 | Mandagere | |
| 2017/0261949 | A1 * | 9/2017 | Hoffmann | G05B 13/0265 |
| 2018/0167878 | A1 * | 6/2018 | Lee | H04W 52/0261 |
| 2019/0018471 | A1 * | 1/2019 | Chen | G06F 9/54 |
| 2019/0220073 | A1 * | 7/2019 | Wu | H04L 43/0817 |
| 2020/0142466 | A1 | 5/2020 | Naik | |
| 2020/0167190 | A1 * | 5/2020 | Bernat | G06F 9/505 |
| 2020/0379533 | A1 * | 12/2020 | Suzuki | G06F 9/4893 |

FOREIGN PATENT DOCUMENTS

| | | | |
|---|---|---|---|
| CN | 111143174 | A | 5/2020 |
| JP | 2017-531245 | A | 10/2017 |
| WO | 2016/028371 | A1 | 2/2016 |

OTHER PUBLICATIONS

Bircher et al., "Complete System Power Estimation Using Processor Performance Events," IEEE Transactions on Computers, Feb. 17, 2011, 18 pages. <https://ieeexplore.ieee.org/document/5714687?arnumber=5714687>.

Grot et al., "Optimizing Data-Center TCO with Scale-Out Processors," IEEE Micro, Special Issue on Energy-Aware Computing, Sep. 4, 2012, 14 pages. <https://ieeexplore.ieee.org/document/6290314>.

Mell et al., "The NIST Definition of Cloud Computing," Recommendations of the National Institute of Standards and Technology, U.S. Department of Commerce, Special Publication 800-145, Sep. 2011, 7 pages.

Rajamani et al., "Power-Performance Management on an IBM POWER7 Server," Proceedings of the 16th ACM/IEEE international symposium on Low power electronics and design, Aug. 2010, pp. 201-206. <https://dl.acm.org/doi/abs/10.1145/1840845.1840885>.

International Search Report and Written Opinion dated Sep. 23, 2021 from International Application No. PCT/IB2021/055315 filed Jun. 16, 2021.

Japan Patent Office, "Notice of Reasons for Refusal," Dec. 17, 2024, 6 Pages, JP Application No. 2022-570218.

Intellectual Property Office, Patents Act 1977: Examination Report under Section 18(3), Jun. 11, 2025, 05 Pages, GB Application No. 2300445.0.

Response to the examination report dated Aug. 15, 2025, mailed on Aug. 29, 2025, Application No. 10-2022-7040980, 2 pages.

Intellectual Property Office, "Patents Act 1977: Search Report under Section 17(5)", Feb. 10, 2026, 3 Pages, GB Application No. 2300445.0.

Innovation, Science and Economic Development Canada, "Office Action," Jan. 20, 2026, 9 Pages, CA Application No. 3176180.

Intellectual Property Office, Patents Act 1977: Examination Report under Section 18(3), Aug. 15, 2025, 05 Pages, GB Application No. 2300445.0.

Intellectual Property Office, "Request for the Submission of an Opinion," Aug. 28, 2025, 07 Pages, KR Application No. 10-2022-7040980.

* cited by examiner

POWER-PERFORMANCE BASED SYSTEM MANAGEMENT

BACKGROUND

Many modern computer systems focus on balancing increased performance with the total cost of ownership (TCO), especially in large data centers (e.g. Hyper Scale Data Centers). The TCO includes the Total Cost of Acquisition (TCA), maintenance costs, and electricity charges due to power consumption. The TCA as well as maintenance costs are generally fixed investments, but the charges due to power consumption will vary based on the workloads and configurations of the computer system.

SUMMARY

Aspects of the disclosure may include a method, computer program product, and system. One example of the method comprises receiving a workload for a computer system; sweeping at least one parameter of the computer system while executing the workload; monitoring one or more characteristics of the computer system while sweeping the at least one parameter, the one or more characteristics including total power consumption of the computer system; generating a power profile for the workload that indicates a respective selected value for the at least one parameter based on analysis of the monitored total power consumption of the computer system while sweeping the at least one parameter; and executing the workload based on the respective selected value of the at least one parameter.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
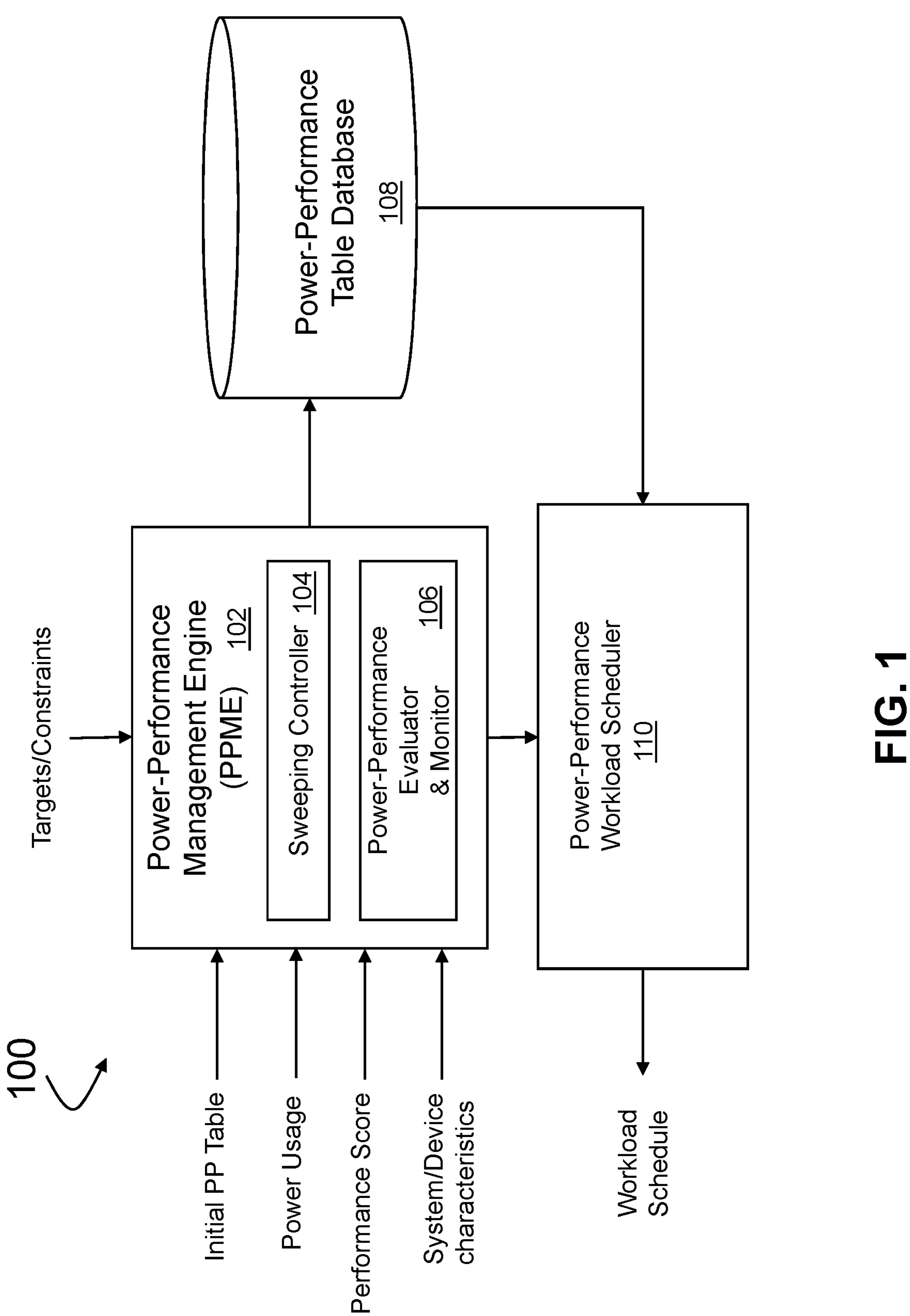
FIG. 1 is a block diagram of one embodiment of a computer management system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As discussed above, some systems focus on balancing increased performance with the total cost of ownership (TCO), especially in large data centers (e.g. Hyper Scale Data Centers). The TCO includes the Total Cost of Acquisition (TCA), maintenance costs, and electricity charges due to power consumption. The TCA as well as maintenance costs are generally fixed investments. The embodiments described herein are configured improve or optimize the performance per power (e.g. Watt) of the computer system to help reduce the TCO.

Some modern central processing units (CPUs) are able to adjust their frequency with different workloads to utilize a power budget of the CPU. For example, if the workload is very heavy, the frequency may not reach a high number. However, if the workload is light (e.g. 1 active call and a small portion of the logic in the CPU is being used), the CPU frequency may be adjusted to a relatively high frequency. While such techniques can improve power savings in some situations, they can also suffer from various limitations. For example, if a given workload has a performance bottle neck on a non-CPU device, such as disk, network, memory, graphics processing unit (GPU), etc., then the computer system will reach a higher performance even with a higher CPU frequency and corresponding higher CPU power usage. Additionally, if a workload has a conflict on a CPU internal computation resource between the CPU's multiple processes or threads, the CPU will consume more power with little performance improvement even with increasing CPU frequency. Furthermore, with frequency increase and the corresponding temperature increase, the CPU thermal requirements will often trigger an increased demand for the CPU cooling device (e.g. CPU fan) which can lead to increased power consumption of the cooling device and a resulting drop in Power-Performance rate.

The embodiments described herein help address the limitations discussed and others. In particular, the embodiments described in more detail below enable a more comprehensive, dynamic, self-learning and power-performance based computer system management method which can take into account a plurality of factors, such as workload variation, workload scheduling, total system power consumption, environmental changes, CPU frequency and voltage, etc., to provide a more efficient management scheme that can improve the performance per power usage and/or performance per TCO.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. For example, in some illustrative examples, "at least one of" may be, for example, without limitation, two of item A; one of item B; and ten of item C; four of item B and seven of item C; or other suitable combinations.

Additionally, the term "a" or "an" entity refers to one or more of that entity. As such, the terms "a" (or "an"), "one or more" and "at least one" can be used interchangeably herein.

It is also to be noted that the terms “comprising,” “including,” and “having” can be used interchangeably.

Furthermore, the term “automatic” and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be “material.”

In addition, as used herein, the term “workload” refers to an amount of processing a computer system will have to do in a fixed period of time. For example, the workload indicates the amount of load in the form of client requests, processing and communications resources, etc. that is expected in a specified time period Thus, a workload includes such factors as the type and rate of requests sent to the computer system, the software packages and application programs to be executed, the amount of programs/applications running in the computer system, the number of users connecting to the computer system’s applications, how much time and processing power those interactions consume, etc. The workload can also include work that the computer system is doing in the background. For example, if the computer system contains file systems that are frequently accessed by other systems, handling those accesses can be a significant fraction of the overall workload, even if the computer system is not officially a server.

FIG. 1 is a high-level block diagram of one embodiment of a power-performance management system 100 configured to manage a computer system based on a power-performance rate. In other words, the power-performance management system 100 is configured to improve the power to performance ratio of the computer system to reduce the total cost of ownership of the computer system. The power-performance management system 100 can be a part of the overall computer system being managed by the power-performance management system 100. Additionally, the computer system being managed can include a single device or multiple devices, such as a data center with hundreds or thousands of servers.

The power-performance management system 100 includes a power-performance management engine (PPME) 102, a power-performance workload scheduler 110 and a power-performance table database 108. The PPME 102 is configured to generate a power-performance table for each of a plurality of workloads to be executed or being executed by the computer system. The respective power-performance table for each workload indicates a selected value for at least one parameter of the computer system or device that has been selected to improve the power to performance rate of the computer system or device (e.g. the power efficiency of the computer system) and thereby reduce the total cost of ownership. The PPME 102 receives various inputs used to determine and generate the power-performance table for a workload. For example, the inputs can include power usage information, system and/or device characteristics, a performance score for each workload if available, and an initial power-performance table for the workload if available. The initial power-performance table may be available for a workload which has been previously profiled by the PPME 102. However, an initial power-performance table is not available for all workloads, such as new workloads or workloads which have not been previously profiled.

The power usage information can include information about the total power consumption/usage of the computer system and can include a breakdown of the power usage to individual components of the computer system. For example, the power usage information can include, but is not limited to, CPU power usage, graphics processing unit (GPU) power usage, fan power usage, memory power usage, disk power usage, etc. The device and/or system characteristics can include, but are not limited to, memory bandwidth, memory latency, state (e.g. idle/sleep or active/awake) of a device, disk and/or network input/output (I/O) bandwidth, etc.

The performance score for a workload (also referred to as a performance objective) can indicate a measurement which is to be used to measure the performance of the computer system and/or a desired performance outcome. For example, in some situations, the performance score may indicate that the desired performance is to increase or maximize system throughput while preserving a specified worst-case response time. In other situations, the performance score can be based on other performance measurements, such as, but not limited to, obtaining the best possible response time for a constant workload, minimum response time to user requests, etc. The determination of performance scores can be set by a user or system manager, in some embodiments.

Additionally, the PPME 102 can receive targets and/or constraints for the computer system. The targets/constraints can define certain parameters or range of conditions in which the workload is to be executed. For example, the targets/constraints can define parameters, such as but not limited to, a maximum total power usage (e.g. total power for a data center, rack, and/or node), total run time to complete the workload, maximum and/or minimum number of CPUs and/or cores for the workload, minimum and/or maximum memory bandwidth/latency, minimum and/or maximum network bandwidth/latency, etc.

The PPME 102 includes a sweeping controller 104 and a power-performance evaluator and monitor 106. The sweeping controller 104 is configured to sweep (e.g. iteratively adjust/change) one or more parameters of the computer system. For example, in some embodiments, the sweeping controller 104 can be configured to sweep one or more of a CPU frequency, a GPU frequency, a number of active cores in a multi-core processor, memory bandwidth/latency, device state, etc. in accordance with any received targets/constraints for the workload. That is, the sweeping controller 104 can sweep the parameters without adjusting a value which would be in conflict with the constraint, such as adjusting a number of active cores below a specified minimum number of active cores for the workload, exceeding a maximum run time, etc. The sweeping controller 104 can be configured to sweep each parameter sequentially (i.e. completely sweep one parameter before sweeping another) or to sweep multiple parameters in parallel (e.g. interleaving adjustments to multiple parameters or simultaneously sweeping two or more parameters).

The power-performance evaluator and monitor 106 is configured to profile the workload with the total power consumption of the whole computer system. In particular, the power-performance evaluator and monitor 106 is configured to collect the power usage information and system/device characteristics discussed herein as inputs to the PPME 102 while the sweeping controller 104 is sweeping the one or more parameters. For example, the power-performance evaluator and monitor 106 can collect the power consumption breakdown, the sweeping information (e.g. values of the parameters being swept), memory bandwidth, number of active cores, disk or network usage, etc. The power-performance evaluator and monitor 106 is configured to evaluate the collected information with respect to any received targets or constraints, such as response or run time, throughput constraints, etc. Additionally, the power-performance evaluator and monitor 106 can send commands, in some embodiments, to the sweeping controller 104 to adjust the one or more parameters based on the evaluation of the collected data.

Furthermore, based on the evaluation, the power-performance evaluator and monitor 106 selects a value, within any applicable constraints, for each of the one or more parameters which increases performance or maintains performance within defined constraints while reducing power usage. That is, the power-performance evaluator and monitor 106 seeks to optimize the balance between performance of the computer system and the power usage of the computer system. That is, a value can be selected which may not result in the highest performance but has a sufficient power usage saving compared to a value with the highest performance. Similarly, the selected value may not result in the least power usage but has a sufficient performance improvement over the value with the least power usage. In some embodiments, the value which results in the highest performance per watt of power usage is selected. The power-performance evaluator and monitor 106 saves the selected values in a power-performance profile or table for a respective workload which is saved in the power-performance table database 108. In other words, the power-performance evaluator and monitor 106 can determine the settings which best achieve or exceed the desired performance score with the least amount of power usage given any applicable targets/constraints.

It is to be understood that in some embodiments, the PPME 102 is configured to divide up a given workload into two or more stages or sub-parts. For example, a given workload may have different computation requirements at the beginning of the workload than in the middle or end of the workload. Thus, the workload can be divided into sub-parts or stages. In such situations, the PPME 102 is configured to perform the sweeping and monitoring for each stage separately to develop a power-performance table for each stage. Thus, such a workload may have multiple power-performance tables stored in the power-performance table database 108. In other embodiments, the multiple tables corresponding to the multiple stages can be merged/combined into a single power-performance table for the workload.

When a workload is to be executed on the computer system, the PPME 102 can determine if a power-performance table exists for the workload in the power-performance table database 108. If one is available, the PPME 102 can retrieve the respective power-performance table from the power-performance table database 108 to use as a starting point for sweeping parameters and evaluating the power to performance relationship of the workload. That is, the PPME 102 can be configured to update existing power-performance tables for a workload during subsequent executions of the workload. Furthermore, the PPME 102 can be configured to report an exception to the power-performance workload scheduler 110 if the monitored workload performance score or power consumption changes more than a threshold amount as compared with the reference or initial value in the power-performance table for the given workload. For example, the processing needs of a given workload may change during runtime of the workload, such as due to change in the data, input, user behavior/operation during execution of the workload. In such a scenario, the exception can trigger another round of sweeping and monitoring to update the power-performance table for the given workload to reflect/characterize the changed workload. In some embodiments, the changed workload is considered a new workload with a new power-performance table created rather than updating an existing power-performance table.

It is to be understood that in some embodiments, the PPME 102 can be configured to generate a power-performance table for each workload executed on the computer system. In other embodiments, the PPME 102 can be configured to generate and/or update a power-performance table for a subset of the total number of workloads executed on the computer system. For example, in some embodiments, a user can specify the types of workloads to be profiled by the PPME 102 such that only some, but not all, workloads are profiled.

When a workload is being executed by the computer system, the power-performance workload scheduler 110 can retrieve the associated power-performance table/profile for the workload, as well as any updates from the PPME 102, and configure the system to execute the workload using the settings in the associated power-performance table (e.g. CPU frequency, GPU frequency, number of active cores, etc.). In this way, the management system 100 is able to take into account hardware characteristics, software applications, power usage of individual components (e.g. CPU, GPU, fan, etc.) as well as total computer system power usage to determine the proper settings/parameters for executing a workload that will meet certain performance scores and/or constraints while reducing power usage and, thereby, also decrease total cost of ownership. Thus, the embodiments described herein enable a full stack (software/hardware) power-performance based management scheme.

Figure 2:
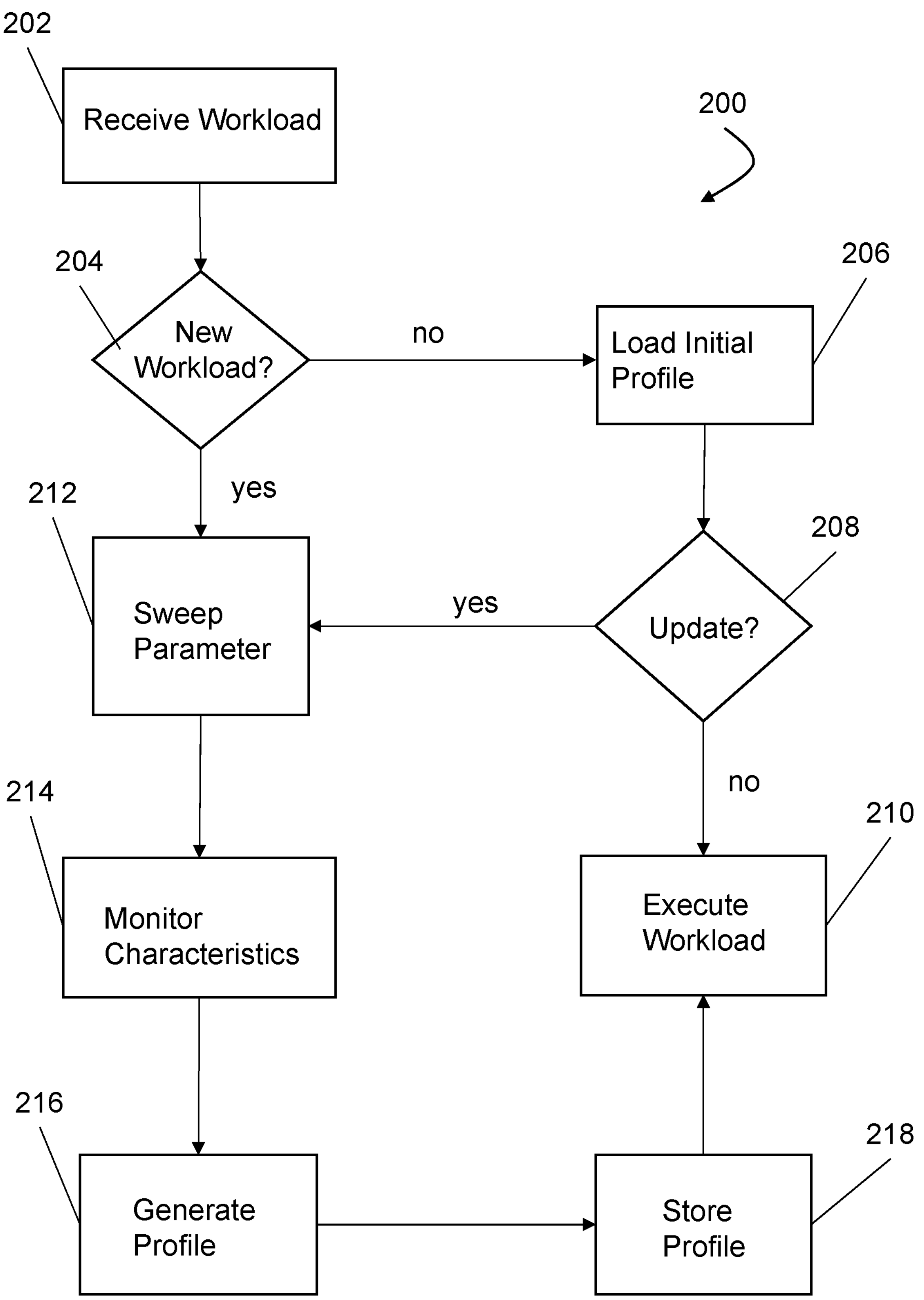
FIG. 2 is a flow diagram of one embodiment of a method of managing a computer system.

FIG. 2 is a flow diagram of one embodiment of a method 200 for managing a computer system. The method 200 can be performed by a management system such as management system 100 described above which includes a PPME and a power-performance workload scheduler. It is to be understood that the order of actions in example method 200 is provided for purposes of explanation and that the method 200 can be performed in a different order in other embodiments. For example, some actions may occur simultaneously rather than in serial fashion as described for ease of explanation. Similarly, it is to be understood that some actions can be omitted or additional actions can be included in other embodiments.

At 202, a workload to be profiled is received. Receiving a workload can include receiving information regarding a workload to be executed or receiving a signal or command to profile a workload that is already being executed. For example, a user can define settings to indicate which workloads to profile. In other words, in some embodiments all workloads are profiled, whereas in other embodiments, only a subset of workloads are profiled based on the user-defined settings. At 204, it is determined if the workload is a new workload. That is, it is determined if the workload has been previously profiled (e.g. a power performance table for the workload is stored in a power-performance table database).

If the workload is not a new workload, then an initial power-performance table from a power-performance table database is retrieved at 206. The settings from the power-performance table are used in running the workload. For example, the settings regarding CPU frequency, number of cores, constraints on disk/memory/network usage, etc. are applied in executing the workload. At 208, it is determined if the initial power-performance table is to be updated. For example, in some embodiments, all or a portion of power-performance tables, based on user settings, are set to be updated when the corresponding workload is executed. Additionally, in some embodiments, a workload is monitored while being executed at 210 and if monitored values change beyond a certain threshold while the workload is executing then an update can be triggered, such as via an exception reported to a power-performance workload scheduler. In some embodiments, if the changes exceed the threshold, the workload is treated as a new workload and a new power-performance table is generated for the workload. If the initial power-performance table is not being updated, then the method 200 continues at 210 where the workload is executed based on the settings in the power-performance table corresponding to the workload.

If the workload is a new workload at 204 or if the initial power-performance table is to be updated at 208, then method 200 proceeds to 212 where a PPME sweeps at least one parameter of the computer system while executing the workload. In other words, as described above, the PPME iteratively adjusts at least one parameter. For example, the PPME can start a lowest CPU frequency and iteratively adjust the CPU frequency in predetermined amounts until it reaches a highest CPU frequency for the CPU. As discussed above, other parameters which can be swept in addition to or in lieu of the CPU frequency include, but are not limited to, GPU frequency, number of active cores, memory bandwidth, active state of a device, etc. In some embodiments, targets or constraints have been provided for the workload being profiled. Thus, the sweeping is done in accordance with those constraints, as discussed above, such that the targets or constraints are not violated (e.g. maximum run time is not exceeded, minimum number of active cores is met, etc.).

At 214, while the at least one parameter is being swept, the PPME monitors and evaluates various characteristics of the system, as described above, and correlates the monitored characteristics with the values of the parameters being swept. Such characteristics can include, but are not limited to, the total power consumed by the system as well as the portion of the total power consumed by individual components as the parameters are being swept, environmental temperature, wattage of the power supply to the processor or other components, response times, bandwidth, latency, etc. as discussed above. Based on the monitored characteristics and analysis/evaluation of the power consumption, the PPME selects a respective value for each parameter being swept that increases performance and/or maintains performance within a desired performance score and/or complies with any targets/constraints while also reducing the power consumed during execution of the workload. In this way, the performance per power usage is improved which, as discussed above, can result in reduced total cost of ownership. At 216, the PPME then generates or updates a power-performance table including the respective values for each of the one or more parameters being swept (e.g. CPU frequency, GPU frequency, core count, memory information, disk information, and/or other run time information). The power-performance table is stored in a power-performance table database at 218.

Additionally, as discussed above, the profiling of a workload including the sweeping of parameters at 212, monitoring characteristics at 214, generating a power-performance table at 216, and storing the power-performance table at 218 can be performed for subparts or stages of a workload. That is, as discussed above, a workload can be divided into smaller subsections for profiling. In this way, variations in the workload can be accounted for to provide more granularity in improving the performance to power ratio.

Method 200 then continues to 210 where the workload is executed with the respective selected values of the one or more parameters. Furthermore, executing the workload with the respective selected values can include scheduling the workload based on the power-performance table for the workload. In particular, the power-performance tables (also referred to herein as power profiles) of a plurality of workloads can be compared to identify two or more compatible workloads based on the respective power profiles. For example, a power profile of a first workload can be compared with respective power profiles of one or more other workloads to identify at least one compatible workload. As used herein, compatible workloads are workloads whose respective power profiles indicate settings which can be executed concurrently or do not conflict (e.g. same or similar settings). For example, two workloads whose respective power profiles indicate the same or similar CPU frequency or GPU frequency, for example, are compatible workloads. Same or similar settings means that any difference between the settings is within a predefined threshold. The management system can then schedule the compatible workloads to be executed concurrently on the same computer system or server. For example, in a data center having hundreds or thousands of servers, compatible workloads can be scheduled on the same servers such that the data center as a whole can benefit from the aggregate improved performance per power usage of the multiple workloads being executed according to the settings in the respective power profiles. In this way, the data center as a whole has improved performance per power and consequently reduced total cost of ownership.

Thus, embodiments described herein enable various benefits through execution of a power-performance based management scheme, such as illustrative method 200, which utilizes a full stack (software-hardware) consideration to obtain performance with lower power usage. By improving or optimizing the performance to power ratio, the total cost of ownership of a computer system can be reduced. Additionally, the workloads can be scheduled based on a complete consideration of different systems/workloads (e.g. configuration, lifetime, environment, etc.) rather than just based on CPU usage. This provides a benefit to the hardware life cycle by improving the usage and scheduling of components (e.g. CPU, fan, etc.). This can also result in lower cost of infrastructure (e.g. due to optimized use of air conditioner, reduction in noise, etc.).

Figure 3:
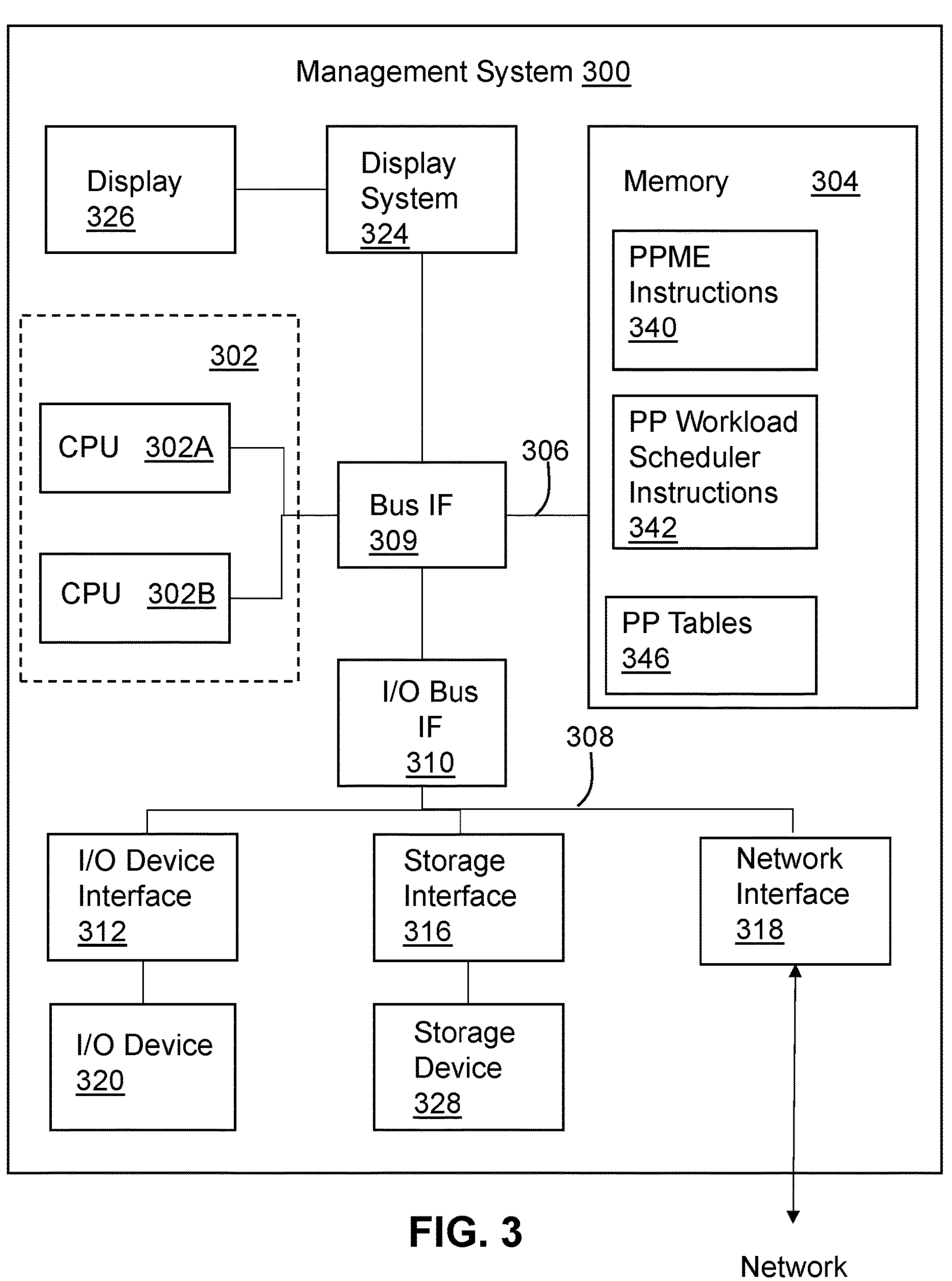
FIG. 3 is a block diagram of another embodiment of a computer management system.

It is to be understood that the management system 100 can be implemented in different ways. For example, in some embodiments, the management system is implemented using software instructions executed on one or more processors, such as in the example management system depicted in FIG. 3. FIG. 3 is a block diagram of one embodiment of an example management system 300. The components of the example management system 300 shown in FIG. 3 include one or more processors 302, a memory 304, a storage interface 316, an Input/Output ("I/O") device interface 312, and a network interface 318, all of which are communicatively coupled, directly or indirectly, for inter-component communication via a memory bus 306, an I/O bus 308, bus interface unit ("IF") 309, and an I/O bus interface unit 310.

In the embodiment shown in FIG. 3, the management system 300 also includes one or more general-purpose programmable central processing units (CPUs) 302A and 302B, herein generically referred to as the processor 302. In some embodiments, the management system 300 contains multiple processors. However, in other embodiments, the management system 300 is a single CPU system. Each processor 302 executes instructions stored in the memory 304.

In some embodiments, the memory 304 includes a random-access semiconductor memory, storage device, or storage medium (either volatile or non-volatile) for storing or encoding data and programs. For example, the memory 304 stores PPME instructions 340 and PP workload scheduler instructions 342. When executed by a processor such as processor 302, the PPME instructions 340 and the PP workload scheduler instructions 342 cause the processor 302 to perform the functions and calculations discussed above with respect to management system 100 in FIG. 1 and method 200 in FIG. 2. Thus, the PPME instructions 340 and the PP workload scheduler instructions 342 cause the processor 302 to implement the PPME 102 (including the sweeping controller 104 and power-performance evaluator and monitor 106) and the power-performance workload scheduler 110 described above.

In some embodiments, the memory 304 represents the entire virtual memory of management system 300 and may also include the virtual memory of other computer systems coupled to the management system 300 via a network. In some embodiments, the memory 304 is a single monolithic entity, but in other embodiments, the memory 304 includes a hierarchy of caches and other memory devices. For example, the memory 304 can exist in multiple levels of caches, and these caches may be further divided by function, so that one cache holds instructions while another holds non-instruction data, which is used by the processor. The memory 304 may be further distributed and associated with different CPUs or sets of CPUs, as is known in any various so-called non-uniform memory access (NUMA) computer architectures, for example. Hence, although the PPME instructions 340 and PP workload scheduler instructions 342 are stored on the same memory 304 in the example shown in FIG. 3 for purposes of explanation, it is to be understood that other embodiments can be implemented differently. For example, the PPME instructions 340 and the PP workload scheduler instructions 342 can be distributed across multiple physical media.

Similarly, in this example, the PP Tables 346 generated through execution of the PPME instructions 340 are stored in memory 304. However, it is to be understood that, in other embodiments, the PP tables 346 are stored differently in other embodiments. For example, in some embodiments, the PP tables 346 can be stored on storage device 328 which is communicatively attached to the storage interface 316. Thus, the PP tables 346 can be stored on a storage device which is local to the management system or located remotely and accessed via a network.

The management system 300 in the embodiment shown in FIG. 3 also includes a bus interface unit 309 to handle communications among the processor 302, the memory 304, the display system 324, and the I/O bus interface unit 310. The I/O bus interface unit 310 is coupled with the I/O bus 308 for transferring data to and from the various I/O units. In particular, the I/O bus interface unit 310 can communicate with multiple I/O interface units 312, 316, and 318, which are also known as I/O processors (IOPs) or I/O adapters (IOAs), through the I/O bus 308. The display system 324 includes a display controller, a display memory, or both. The display controller can provide video, still images, audio, or a combination thereof to a display device 326. The display memory may be a dedicated memory for buffering video data.

The I/O interface units support communication with a variety of storage and I/O devices. For example, the I/O device interface unit 312 supports the attachment of one or more user I/O devices 320, which may include user output devices and user input devices (such as a keyboard, mouse, keypad, touchpad, trackball, buttons, light pen, or other pointing devices). A user can manipulate the user input devices 320 using a user interface, in order to provide input data and commands to the user I/O device 320, such as targets and constraints. Additionally, a user can receive output data via the user output devices. For example, a user interface may be presented via the user I/O device 320, such as displayed on a display device or played via a speaker.

The storage interface 316 supports the attachment of one or more storage devices 328, such as a flash memory. The contents of the memory 304, or any portion thereof, may be stored to and retrieved from the storage device 328 as needed. The network interface 318 provides one or more communication paths from the management system 300 to other digital devices and computer systems.

Although the management system 300 shown in FIG. 3 illustrates a particular bus structure providing a direct communication path among the processors 302, the memory 304, the bus interface 309, the display system 324, and the I/O bus interface unit 310, in alternative embodiments the management system 300 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 310 and the I/O bus 308 are shown as single respective units, the electronic physical note 300, can include multiple I/O bus interface units 310 and/or multiple I/O buses 308 in other embodiments. While multiple I/O interface units are shown, which separate the I/O bus 308 from various communication paths running to the various I/O devices, in other embodiments, some or all of the I/O devices are connected directly to one or more system I/O buses.

FIG. 3 depicts illustrative components of an example management system 300. However, it is to be understood that, in other embodiments, some of the components shown in FIG. 3 can be omitted and/or other components can be included. For example, in some embodiments, the display system 324 and display 326 can be omitted. Additionally, as discussed above, in some embodiments, one or more of the components and data shown in FIG. 3 include instructions or statements that execute on the processor 302 or instructions or statements that are interpreted by instructions or statements that execute the processor 302 to carry out the functions as described herein. However, in other embodiments, one or more of the components shown in FIG. 3 are implemented in hardware via semiconductor devices, chips, logical gates, circuits, circuit cards, and/or other physical hardware devices in lieu of, or in addition to, a processor-based system executing software instructions.

Figure 4:
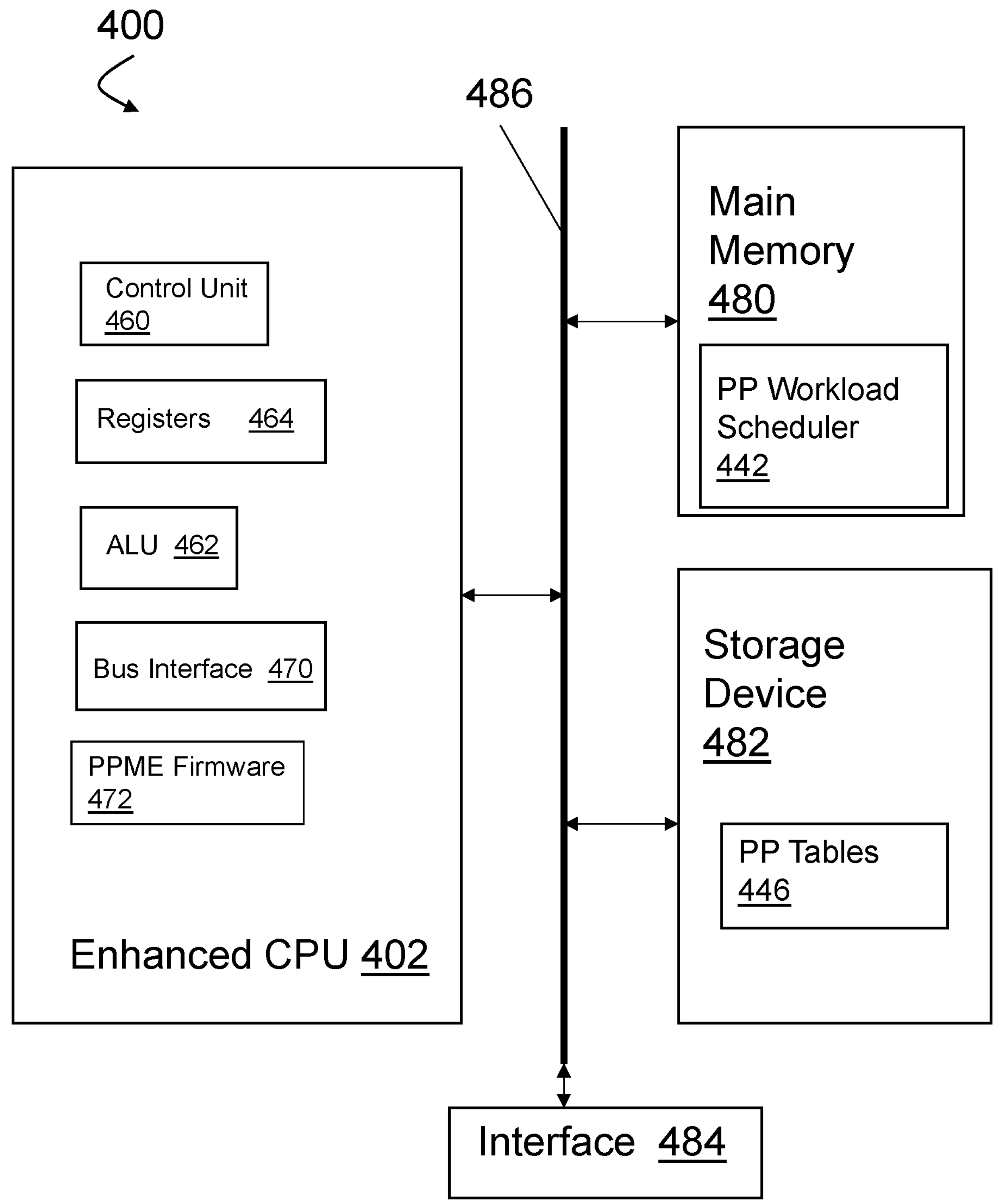
FIG. 4 is a block diagram of another embodiment of a computer management system.

For example, as depicted in FIG. 4, the example management system 400 includes an enhanced CPU 402 which is configured to implement the PPME 102 as firmware embedded in the enhanced CPU 402. It is to be understood that the components of enhanced CPU 460 depicted in FIG. 4 are presented by way of example only and that other components, such as a float pointing unit (FPU), can be included in other embodiments, as understood by one of skill in the art. Additionally, it is to be understood that the components of example management system 400 are presented by way of example only and that other components can be included in other embodiments.

The example management system 400 depicted in FIG. 4 includes the enhanced CPU 402 communicatively coupled to a main memory 480, a storage device 482, and an interface 484 via a bus 486. Main memory 480 is generally included to be representative of a random-access memory (e.g., static random-access memory (SRAM), dynamic random-access memory (DRAM), or Flash). The storage device 482 is generally included to be representative of a non-volatile memory, such as a hard disk drive, solid state device (SSD), removable memory cards, optical storage, or flash memory devices. In an alternative embodiment, the storage device 482 can be replaced by storage area-network (SAN) devices, the cloud, or other devices connected to the management system 400 via a communication network coupled to the interface 484.

In the example of FIG. 4, the enhanced CPU 402 includes a control unit 460, an arithmetic logic unit (ALU) 462, a bus interface 470, and registers 464. As understood by one of skill in the art, the control unit 460 generates signals that control the other components of the CPU 402 to carry out actions specified by instructions. For example, the control unit 460 determines when it is time to fetch an instruction/data, decode an instruction, and execute an instruction. The control unit 460 can be implemented as a finite-state machine and can contain decoders, multiplexer, and other logic components.

The ALU 462, as known to one of skill in the art, is a device that performs arithmetic and logic operations on groups of bits, such as addition, subtraction, comparison, etc. The bus interface 470 connects the CPU 402 to other components of a computer, such as main memory 480, storage device 482 and Input/Output (I/O) device interface 484 via bus 486. For example, the bus interface 470 can contain circuitry to place addresses on an address bus, read and write data on a data bus, and read and write signals on a control bus, as known to one of skill in the art.

Registers 464 provide storage space for data and other information for the performance of tasks, as known to one of skill in the art. As known to one of skill in the art, registers 464 can include general purposes registers, such as, data registers used to store data for arithmetic, logical and other operations, pointer registers used to point to an address or location in memory, and index registers used for indexed addressing. Registers 464 can also include special purpose registers which have a specific defined function for operation of the processor core, as known to one of skill in the art. For example, special purpose registers can include condition code or flag registers used to contain various types of the condition codes during operations and a program counter used to point to the current or next instruction being executed, as known to one of skill in the art.

The enhanced CPU 402 also includes PPME firmware 472 which enables the enhanced CPU 402 to perform the functionality of PPME 102 discussed above. In this example, the functionality of power-performance workload scheduler 110 is implemented as PP workload instructions 442 stored on main memory 480 which can be executed by CPU 402. However, it is to be understood that, in other embodiments, the PP workload scheduler instructions 442 can be replaced with firmware embedded in the enhanced CPU 402. Additionally, although the PP tables 446 are depicted as being stored in storage device 482, the PP tables 446 can be stored differently in other embodiments, such as in a remote storage location accessed via a network.

Figure 5:
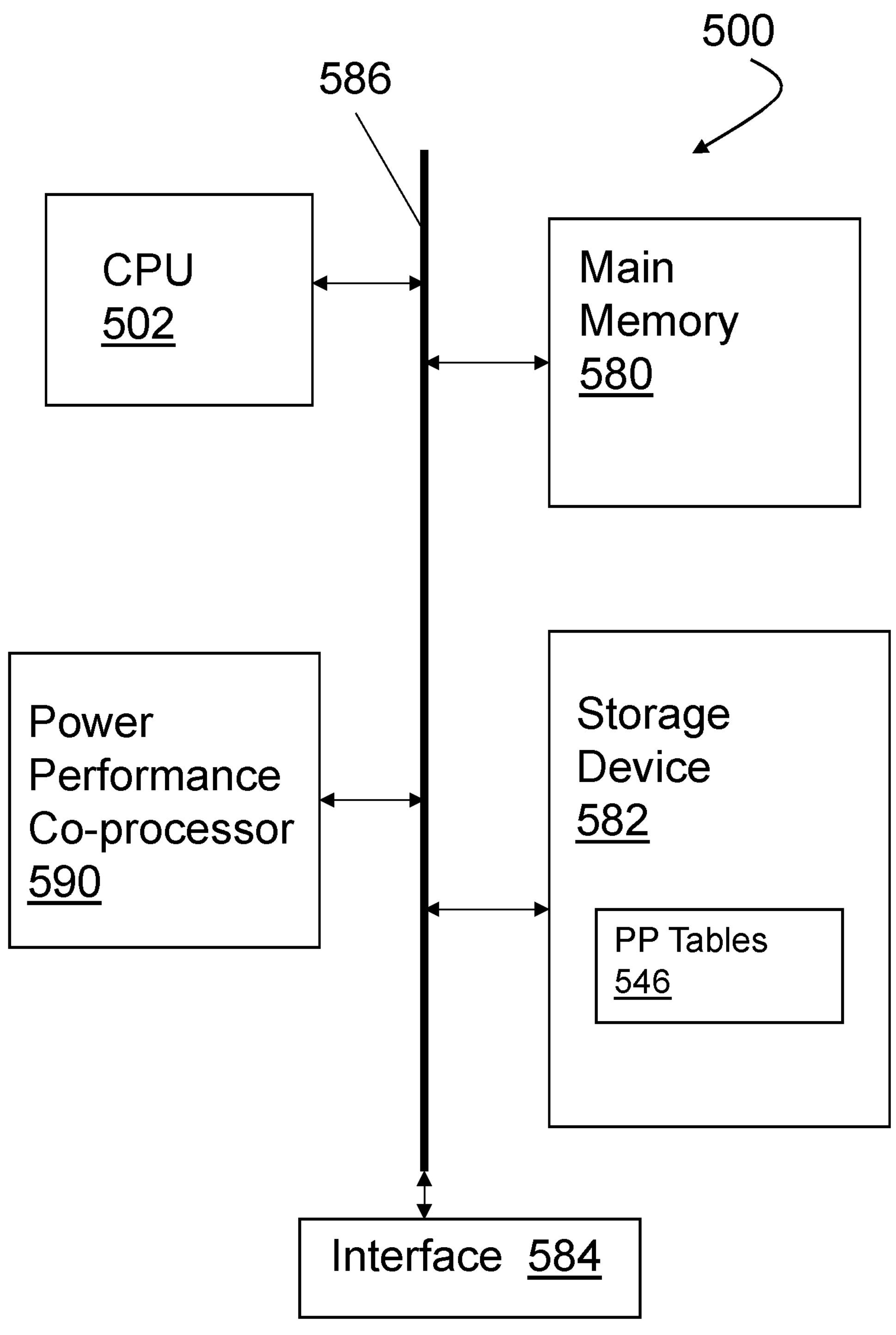
FIG. 5 is a block diagram of another embodiment of a computer management system.

FIG. 5 depicts another example implementation of a management system 500 configured to perform the functionality of management system 100 and method 200 discussed above. The example management system 500 includes a CPU 502 coupled with main memory 580, storage device 582 (storing PP table 546 in this example), interface 584 (e.g. I/O device interface and/or network interface), and power-performance co-processor 590 via bus 586. The main memory 580, storage device 582, interface 584 and bus 586 are similar to main memory 480, storage device 482, interface 484, and bus 486 discussed above with respect to FIG. 4.

In this embodiment, the CPU 502 does not include PPME firmware. Rather, the example management system 500 includes a power-performance co-processor 590. The power-performance co-processor 590 is a hardware device, such as an accelerator, which is configured to perform at least part of the functionality of the PPME 102 and the power-performance workload scheduler 110 discussed above. However, in other embodiments, the power-performance co-processor 590 may configured to only implement functionality of the PPME 102 or the power-performance workload scheduler 110. A co-processor is a computer processor used to supplement the functions of a primary processor (e.g. CPU 502) by enabling the CPU 502 to offload tasks to the co-processor.

Thus, by including a separate co-processor, the example system 500 enables the processing load of the PPME 102 and the power-performance workload scheduler 110 to be offloaded from the CPU 502. The power-performance co-processor 590 can be implemented using any number of semiconductor devices, chips, logical gates, circuits, etc. known to one of skill in the art. Additionally, in some embodiments, the power-performance co-processor 590 can be implemented as a field programmable field array (FPGA) or an application specific integrated circuit (ASIC). Thus, through the discussion of example management systems 300, 400, and 500 in FIGS. 3-5, it is to be understood that the functionality of management system 100 and method 200 can be implemented differently in various embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, in some embodiments, at least a portion of the functionality of the PPME 102 and/or power-performance workload scheduler 110 can be implemented in a cloud computing environment. For example, in some embodiments, the management system 100 can be implemented in a cloud computer system which can include many computers, hundreds or thousands of them, disposed within one or more data centers and configured to share resources over the network. However, it is to be understood that cloud computer systems are not limited to those which include hundreds or thousands of computers and can include fewer than hundreds of computers. Some example cloud computing embodiments are discussed in more detail below. However, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
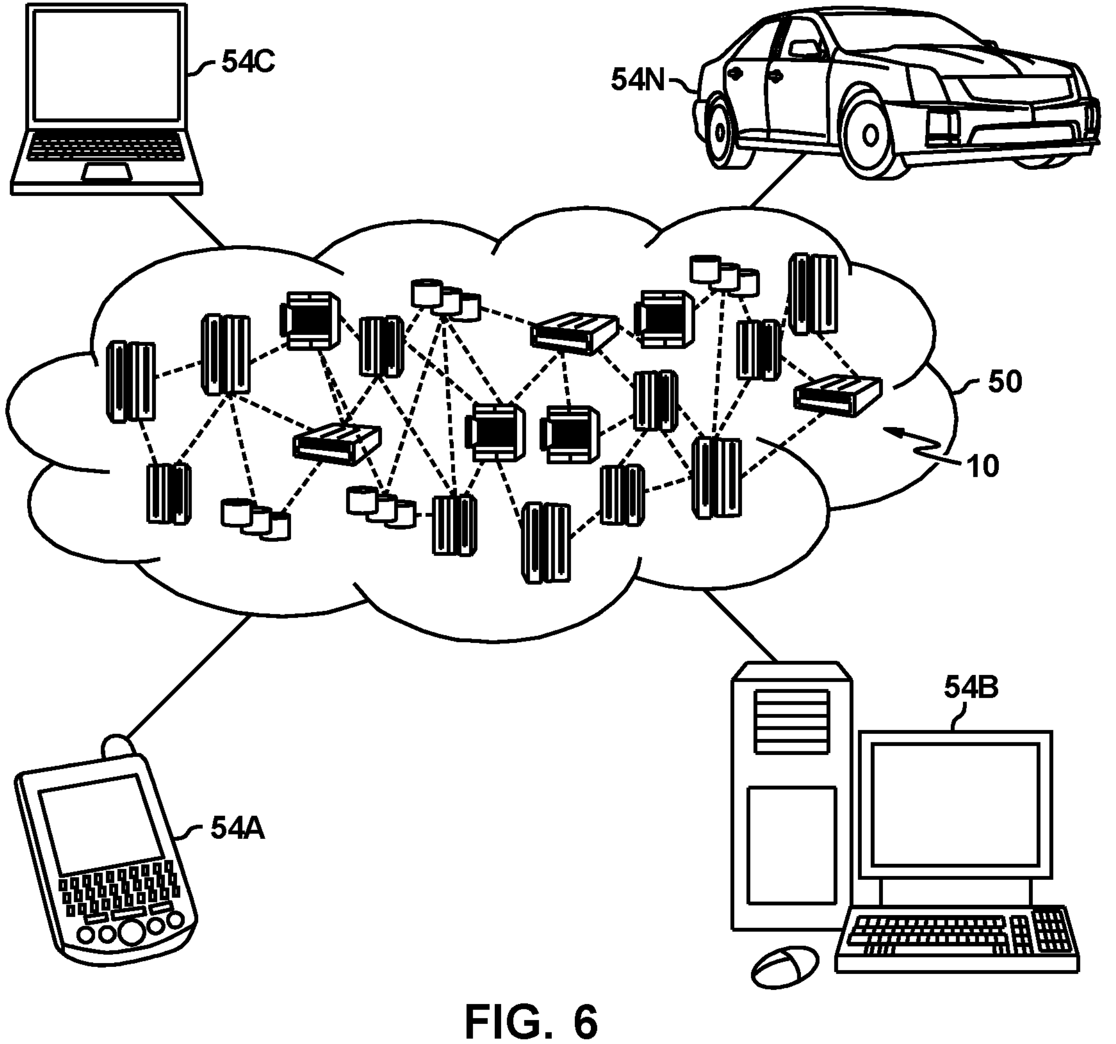
FIG. 6 depicts one embodiment of a cloud computing environment.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
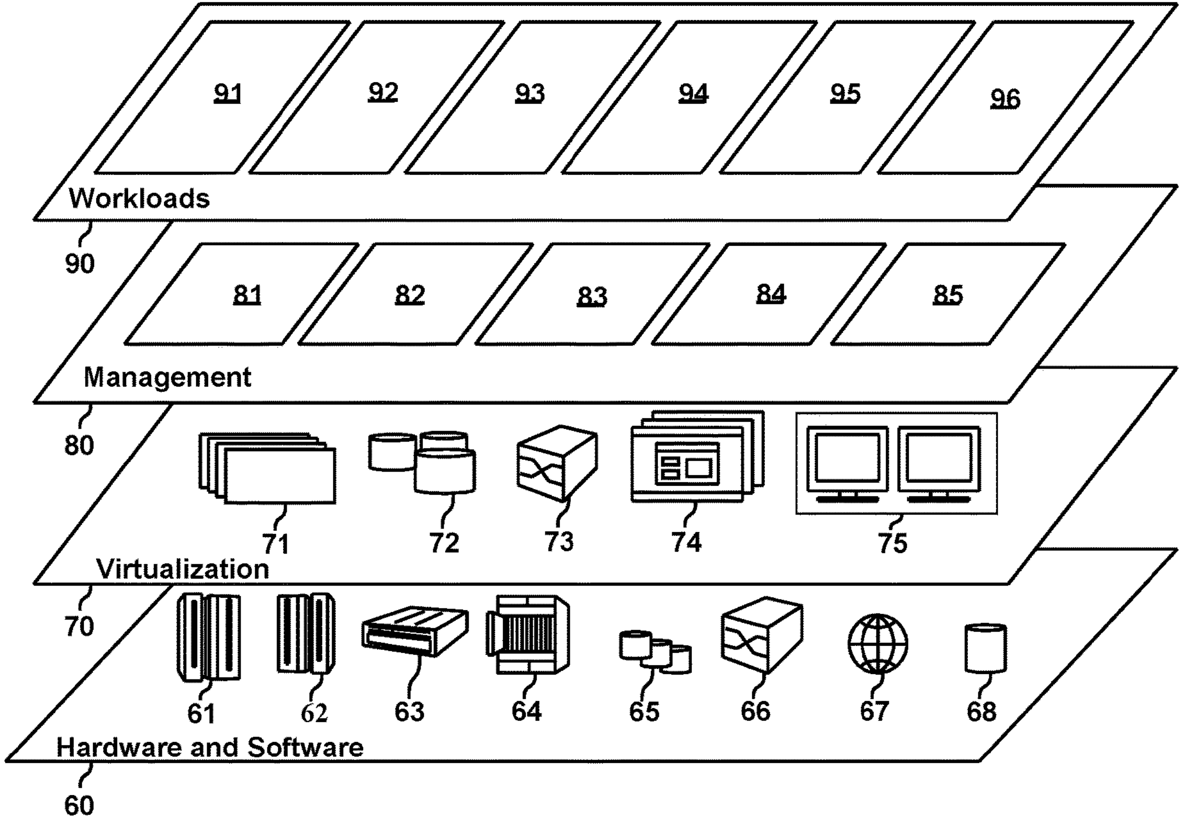
FIG. 7 depicts one embodiment of abstraction model layers.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power-performance based management system 96.

EXAMPLE EMBODIMENTS

Example 1 includes a method for managing a computer system. The method comprises receiving a workload for a computer system; sweeping at least one parameter of the computer system while executing the workload; and monitoring one or more characteristics of the computer system while sweeping the at least one parameter. The one or more characteristics includes total power consumption of the computer system. The method further comprises generating a power profile for the workload that indicates a respective selected value for the at least one parameter based on analysis of the monitored total power consumption of the computer system while sweeping the at least one parameter; and executing the workload based on the respective selected value of the at least one parameter.

Example 2 includes the method of example 1, further comprising receiving one or more constraints on the at least one parameter of the computer system.

Example 3 includes the method of any of examples 1-2, further comprising dividing the workload into two or more stages, wherein sweeping the at least one parameter comprises sweeping the at least one parameter for each of the two or more stages; monitoring the one or more characteristics comprises monitoring the one or more characteristics while sweeping the at least one parameter for each of the two or more stages; and generating a power profile comprises generating a respective power profile for each of the two or more stages.

Example 4 includes the method of any of examples 1-3, wherein sweeping the at least one parameter comprises sweeping at least one of central processing unit (CPU) frequency, graphics processing unit (GPU) frequency, number of active cores in a multi-core processor, memory bandwidth, network bandwidth, and a device state.

Example 5 includes the method of any of examples 1-4, wherein the workload is a first workload and executing the workload based on the respective selected value of the at least one parameter further comprises comparing the power profile of the first workload with a respective power profile of one or more other workloads; identifying a compatible workload based on the comparison of the power profile of the first workload with the respective power profile of the one or more other workloads; and scheduling the compatible workload to be executed concurrently with the first workload.

Example 6 includes the method of any of examples 1-5, wherein the monitored one or more characteristics of the computer system include one or more of central processing unit (CPU) power usage, graphics processing unit (GPU) power usage, fan power usage, memory power usage, disk power usage, memory bandwidth, memory latency, disk input/output bandwidth, and network bandwidth.

Example 7 includes the method of any of examples 1-6, further comprising receiving an initial power profile for the workload; and wherein generating the power profile comprises updating the initial power profile based on analysis of the monitored total power consumption of the computer system while sweeping the at least one parameter.

Example 8 includes a computer management system. The computer management system comprises a storage device; and a processor communicatively coupled to the storage device. The processor is configured to receive a workload for a computer system; iteratively adjust at least one parameter of the computer system while the workload is executed; and monitor one or more characteristics of the computer system while adjusting the at least one parameter. The one or more characteristics includes total power consumption of the computer system. The processor is further configured to generate a power profile for the workload that indicates a respective selected value for the at least one parameter based on analysis of the monitored total power consumption of the computer system while sweeping the at least one parameter; store the power profile on the storage device; and execute the workload based on the power profile.

Example 9 includes the computer management system of example 8, wherein the processor is further configured to receive one or more constraints on the at least one parameter of the computer system.

Example 10 includes the computer management system of any of examples 8-9, wherein the processor is further configured to divide the workload into two or more stages; iteratively adjust the at least one parameter for each of the two or more stages; monitor the one or more characteristics while adjusting the at least one parameter for each of the two or more stages; and generate a respective power profile for each of the two or more stages.

Example 11 includes the computer management system of any of examples 8-10, wherein the processor is configured to iteratively adjust at least one of central processing unit (CPU) frequency, graphics processing unit (GPU) frequency, number of active cores in a multi-core processor, memory bandwidth, network bandwidth, and a device state.

Example 12 includes the computer management system of any of examples 8-11, wherein the workload is a first workload and the processor is further configured to compare the power profile of the first workload with a respective power profile of one or more other workloads; identify a compatible workload based on the comparison of the power profile of the first workload with the respective power profile of the one or more other workloads; and schedule the compatible workload to be executed concurrently with the first workload.

Example 13 includes the computer management system of any of examples 8-12, wherein the monitored one or more characteristics of the computer system include one or more of central processing unit (CPU) power usage, graphics processing unit (GPU) power usage, fan power usage, memory power usage, disk power usage, memory bandwidth, memory latency, disk input/output bandwidth, and network bandwidth.

Example 14 includes the computer management system of any of examples 8-13, wherein the processor is further configured to receive an initial power profile for the workload; and update the initial power profile based on analysis of the monitored total power consumption of the computer system while adjusting the at least one parameter.

Example 15 includes a computer management system. The computer management system comprises a power-performance management engine configured to sweep at least one parameter of a computer system while a workload is executed; to monitor one or more characteristics of the computer system while sweeping the at least one parameter, the one or more characteristics including total power consumption of the computer system; and to generate a power profile for the workload that indicates a respective selected value for the at least one parameter based on analysis of the monitored total power consumption of the computer system. The computer management system further comprises a power-performance workload scheduler configured to schedule the workload for execution based on the generated power profile.

Example 16 includes the computer management system of example 15, wherein the workload is a first workload and the power-performance workload scheduler is further configured to schedule the first workload for execution by comparing the power profile of the first workload with a respective power profile of one or more other workloads; identifying a compatible workload based on the comparison of the power profile of the first workload with the respective power profile of the one or more other workloads; and scheduling the compatible workload to be executed concurrently with the first workload.

Example 17 includes a method for managing a computer system. The method comprises comparing respective power performance tables for each of a plurality of workloads, each power performance table indicating respective values of one or more parameters of a computer system for executing the respective workload. The respective values of the one or more parameters are selected based on monitoring one or more characteristics of the computer system, including power consumption of the computer system, while iteratively adjusting the one or more parameters. The method further comprises identifying at least two compatible workloads based on the comparison of the respective power performance tables; and scheduling the at least two compatible workloads to be executed concurrently by the computer system.

Example 18 includes the method of example 17, wherein the one or more parameters include at least one of central processing unit (CPU) frequency, graphics processing unit (GPU) frequency, number of active cores in a multi-core processor, memory bandwidth, network bandwidth, and a device state.

Example 19 includes the method of any of examples 18-19, wherein the one or more monitored characteristics include one or more of central processing unit (CPU) power usage, graphics processing unit (GPU) power usage, fan power usage, memory power usage, disk power usage, memory bandwidth, memory latency, disk input/output bandwidth, and network bandwidth.

Example 20 includes a computer program product comprising a computer readable storage medium having a computer readable program stored therein, wherein the computer readable program, when executed by a processor, causes the processor to iteratively adjust at least one parameter of a computer system while a workload is executed; monitor one or more characteristics of the computer system while adjusting the at least one parameter, the one or more characteristics including total power consumption of the computer system; generate a power profile for the workload that indicates a respective selected value for the at least one parameter based on analysis of the monitored total power consumption of the computer system; and execute the workload based on the generated power profile.

Example 21 includes the computer program product of example 20, wherein the one or more monitored characteristics include one or more of central processing unit (CPU) power usage, graphics processing unit (GPU) power usage, fan power usage, memory power usage, disk power usage, memory bandwidth, memory latency, disk input/output bandwidth, and network bandwidth.

Example 22 includes the computer program product of any of examples 20-21, wherein the computer readable program is further configured to cause the processor to iteratively adjust the at least one parameter in accordance with one or more constraints on the at least one parameter of the computer system.

Example 23 includes the computer program product of any of examples 20-22, wherein the workload is a first workload and the computer readable program is further configured to cause the processor to the execute the first workload by comparing the power profile of the first workload with a respective power profile of one or more other workloads; identifying a compatible workload based on the comparison of the power profile of the first workload with the respective power profile of the one or more other workloads; and scheduling the compatible workload to be executed concurrently with the first workload.

Example 24 includes the computer program product of any of examples 20-23, wherein the computer readable program is further configured to cause the processor to divide the workload into two or more stages; iteratively adjust the at least one parameter for each of the two or more stages; monitor the one or more characteristics while adjusting the at least one parameter for each of the two or more stages; and generate a respective power profile for each of the two or more stages.

Example 25 includes the computer program product of any of examples 20-24, wherein the computer readable program is further configured to cause the processor to iteratively adjust at least one of central processing unit (CPU) frequency, graphics processing unit (GPU) frequency, number of active cores in a multi-core processor, memory bandwidth, network bandwidth, and a device state.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:

receiving a workload for a computer system;

sweeping a plurality of parameters of the computer system while executing the workload;

monitoring one or more characteristics of the computer system while sweeping the plurality of parameters, the one or more characteristics including total power consumption and performance measurement of the computer system;

generating a power profile for the workload that specifies a single value for each parameter of the plurality of parameters, the single value for each parameter selected to maximize performance per power usage based on analysis of the monitored total power consumption and performance measurement of the computer system while sweeping the plurality of parameters; and executing the workload concurrently with one or more other workloads based on the specified value of each parameter of the plurality of parameters in the power profile being within a predefined threshold of corresponding specified values of parameters in power profiles of the one or more other workloads.

2. The method of claim 1, further comprising receiving one or more constraints on the plurality of parameters of the computer system.

3. The method of claim 1, further comprising dividing the workload into two or more stages;

wherein sweeping the plurality of parameters comprises sweeping the plurality of parameters for each of the two or more stages;

wherein monitoring the one or more characteristics comprises monitoring the one or more characteristics while sweeping the plurality of parameters for each of the two or more stages; and wherein generating a power profile comprises generating a respective power profile for each of the two or more stages.

4. The method of claim 1, wherein sweeping the plurality of parameters comprises sweeping at least two parameters selected from the group consisting of central processing unit (CPU) frequency, graphics processing unit (GPU) frequency, and number of active cores in a multi-core processor.

5. The method of claim 1, wherein the monitored one or more characteristics of the computer system include one or more of central processing unit (CPU) power usage, graphics processing unit (GPU) power usage, fan power usage, memory power usage, disk power usage, memory bandwidth, memory latency, disk input/output bandwidth, and network bandwidth.

6. The method of claim 1, further comprising receiving an initial power profile for the workload; and wherein generating the power profile comprises updating the initial power profile based on analysis of the monitored total power consumption of the computer system while sweeping the plurality of parameters.

7. A computer management system comprising:

a storage device; and a processor communicatively coupled to the storage device, wherein the processor is configured to:

receive a workload for a computer system;

iteratively adjust a plurality of parameters of the computer system while the workload is executed;

monitor one or more characteristics of the computer system while adjusting the plurality of parameters, the one or more characteristics including total power consumption and performance measurement of the computer system;

generate a power profile for the workload that specifies a single value for each parameter of the plurality of parameters, the single value for each parameter selected to maximize performance per power usage based on analysis of the monitored total power consumption and performance measurement of the computer system while sweeping the plurality of parameters;

store the power profile on the storage device; and execute the workload concurrently with one or more other workloads based on the specified value of each parameter of the plurality of parameters in the power profile being within a predefined threshold of corresponding specified values of parameters in power profiles of the one or more other workloads.

8. The computer management system of claim 7, wherein the processor is further configured to receive one or more constraints on the plurality of parameters of the computer system.

9. The computer management system of claim 7, wherein the processor is further configured to:

divide the workload into two or more stages;

iteratively adjust the plurality of parameters for each of the two or more stages;

monitor the one or more characteristics while adjusting the plurality of parameters for each of the two or more stages; and generate a respective power profile for each of the two or more stages.

10. The computer management system of claim 7, wherein the processor is configured to iteratively adjust at least two parameters selected from the group consisting of central processing unit (CPU) frequency, graphics processing unit (GPU) frequency, number of active cores in a multi-core processor.

11. The computer management system of claim 7, wherein the monitored one or more characteristics of the computer system include one or more of central processing unit (CPU) power usage, graphics processing unit (GPU) power usage, fan power usage, memory power usage, disk power usage, memory bandwidth, memory latency, disk input/output bandwidth, and network bandwidth.

12. The computer management system of claim 7, wherein the processor is further configured to:

receive an initial power profile for the workload; and update the initial power profile based on analysis of the monitored total power consumption of the computer system while adjusting the plurality of parameters.

13. A computer management system comprising:

a power-performance management engine configured to:

sweep a plurality of parameters of a computer system while a workload is executed;

monitor one or more characteristics of the computer system while sweeping the plurality of parameters, the one or more characteristics including total power consumption and performance measurement of the computer system; and generate a power profile for the workload that specifies a single value for each parameter of the plurality of parameters, the single value for each parameter selected to maximize performance per power usage based on analysis of the monitored total power consumption and performance measurement of the computer system; and a power-performance workload scheduler configured to schedule the workload for execution concurrently with one or more other workloads based on the specified value of each parameter of the plurality of parameters in the generated power profile being within a predefined threshold of corresponding specified values of parameters in power profiles of the one or more other workloads.

14. A method comprising:

comparing, by a power-performance management engine (PPME), respective power performance tables for each of a plurality of workloads, each power performance table specifying a single value for at least one parameter of a plurality of parameters of a computer system for executing the respective workload, and wherein the specified values of the plurality of parameters are selected to maximize performance per power usage based on monitoring one or more characteristics of the computer system, including power consumption and performance measurement of the computer system, while iteratively adjusting the plurality of parameters;

identifying, by the PPME, at least two compatible workloads based on determining respective specified values for the plurality of parameters in the respective power performance tables are within a predefined threshold from the comparison of the respective power performance tables;

scheduling, by a power-performance workload scheduler, the at least two compatible workloads to be executed concurrently by the a second computer system; and concurrently executing the at least two compatible workloads on the second computer system based on the respective specified values for the plurality of parameters in the respective power performance tables being within a predefined threshold from the comparison of the respective power performance tables.

15. The method of claim 14, wherein the plurality of parameters includes at least two parameters selected from the group consisting of central processing unit (CPU) frequency, graphics processing unit (GPU) frequency, number of active cores in a multi-core processor.

16. The method of claim 14, wherein the one or more monitored characteristics include one or more of central processing unit (CPU) power usage, graphics processing unit (GPU) power usage, fan power usage, memory power usage, disk power usage, memory bandwidth, memory latency, disk input/output bandwidth, and network bandwidth.

17. A computer program product comprising a computer readable storage medium having a computer readable program stored therein, wherein the computer readable program, when executed by a processor, causes the processor to:

iteratively adjust plurality of parameters of a computer system while a workload is executed;

monitor one or more characteristics of the computer system while adjusting the plurality of parameters, the one or more characteristics including total power consumption and performance measurement of the computer system;

generate a power profile for the workload that specifies a single value for each parameter of the plurality of parameters, the single value for each parameter selected to maximize performance per power usage based on analysis of the monitored total power consumption and performance measurement of the computer system; and execute the workload concurrently with one or more other workloads based on the specified value of each parameter of the plurality of parameters in the generated power profile being within a predefined threshold of corresponding specified values of parameters in power profiles of the one or more other workloads.

18. The computer program product of claim 17, wherein the one or more monitored characteristics include one or more of central processing unit (CPU) power usage, graphics processing unit (GPU) power usage, fan power usage, memory power usage, disk power usage, memory bandwidth, memory latency, disk input/output bandwidth, and network bandwidth.

19. The computer program product of claim 17, wherein the computer readable program is further configured to cause the processor to iteratively adjust the plurality of parameters in accordance with one or more constraints on the plurality of parameters of the computer system.

20. The computer program product of claim 17, wherein the computer readable program is further configured to cause the processor to:

divide the workload into two or more stages;

iteratively adjust the plurality of parameters for each of the two or more stages;

monitor the one or more characteristics while adjusting the plurality of parameters for each of the two or more stages; and generate a respective power profile for each of the two or more stages.

21. The computer program product of claim 17, wherein the computer readable program is further configured to cause the processor to iteratively adjust at least two parameters selected from the group consisting of central processing unit (CPU) frequency, graphics processing unit (GPU) frequency, number of active cores in a multi-core processor.

* * * * *